(12) United States Patent
Sasaki et al.

(10) Patent No.: US 6,368,521 B1
(45) Date of Patent: Apr. 9, 2002

(54) WATER-BASED COATING COMPOSITION

(75) Inventors: Makoto Sasaki; Takafumi Ishii; Hitoshi Yuasa; Masanobu Suga, all of Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/537,644

(22) Filed: Mar. 29, 2000

(30) Foreign Application Priority Data

Mar. 29, 1999 (JP) .......................................... 11-085530
Jul. 13, 1999 (JP) .......................................... 11-199586

(51) Int. Cl.$^7$ .............................. F21V 9/04; C08F 26/06; C07G 1/00
(52) U.S. Cl. ................... 252/589; 526/261; 106/287.21
(58) Field of Search .......................... 252/589; 526/261; 106/287.21

(56) References Cited

U.S. PATENT DOCUMENTS 5,198,498 A * 3/1993 Valet et al. ................. 525/100
5,356,995 A * 10/1994 Valet et al. ................. 525/100
6,096,846 A * 8/2000 Oda et al. .................... 526/261

FOREIGN PATENT DOCUMENTS

JP 57-142975 9/1982
JP 9-012642 * 1/1997

* cited by examiner

Primary Examiner—Philip Tucker
(74) Attorney, Agent, or Firm—Akin, Gump, Strauss, Hauer & Feld, L.L.P.

(57) ABSTRACT

Acrylic copolymers derived from a monomer mixture containing a vinyl monomer having a benzotriazole skeleton which is high in ultraviolet absorptivity and wide in ultraviolet absorptive wavelength range, an acrylic ester and a methacrylic ester are useful for the preparation of a non-water-based coating composition forming a coating film having an ultraviolet shielding ability. Acrylic copolymers derived from the above monomer mixture further containing a vinyl monomer containing carboxyl groups are useful for the preparation of a water-based coating composition having an ultraviolet shielding ability.

8 Claims, No Drawings

WATER-BASED COATING COMPOSITION

BACKGROUND OF THE INVENTION

1. Field of the Invention

This invention relates to acrylic copolymers having the capability of absorbing ultraviolet and to water-based coating compositions containing the same.

2. Description of the Prior Art

A coating method has been employed for a long time in which a coating material containing an ultraviolet-absorptive agent is applied to a surface of a material or glass in order to shield ultraviolet light or prevent the same from fading and deteriorating the material. Most of such conventional coating materials have been produced by mixing an ultraviolet absorbing agent having a benzotriazole- or hydroxybenzophenone-skeleton with a polymer having the ability of forming a film. However, these ultraviolet-absorbing agents fail to be increased in concentration in the coating material and also result in bleeding from the ultraviolet absorptive layer with a lapse of time, due to poor miscibility with the polymer.

Such inconveniences can be solved by a method in which to synthesize a polymeric compound having a benzotriazole- or hydroxybenzophenone-skeleton which is contributive to ultraviolet absorption, followed by copolymerization of the polymeric compound with a monomer compound. For example, Japanese Laid-Open Patent Publication No. 9-12642 discloses a method in which a polymeric monomer is prepared by chemically bonding benzotriazole or hydroxybenzophenone to acrylic acid or methacrylic acid and then copolymerized.

However, since benzotriazole and hydroxybenzophenone skeletons having no substituents are restricted in the wavelength range of ultraviolet to absorb, it is difficult to absorb all of the ultraviolet light within the range from 390 to 400 nm with the polymeric compound having a simple benzotriazole or hydroxybenzophenone skeleton. It has been found effective to introduce a chlorine atom or a t-butyl group to a benzotriazole skeleton as disclosed in Japanese Laid-Open Patent Publication No. 57-142975 and Japanese Patent Publication No. 4-20913. However, currently it is not an easy operation to incorporate the benzotriazole skeleton having a chlorine atom or a t-butyl group introduced therein into a polymer chain.

Conventional polymers with an ultraviolet absorbing ability have a drawback that they must be dissolved or dispersed in an organic solvent when being applied to a surface of a material or glass, due to their poor solubility in water. However, since such an organic solvent involves problems that it is highly flammable and toxic to the human body, it has been strongly demanded to develop a coating composition having an ultraviolet absorbing ability and requiring no organic disperse medium.

One object of the present invention is to provide an acrylic copolymer containing a comonomer having a benzotriazole skeleton which is high in absorptivity of ultraviolets and wide in absorptive wavelength range thereof and thus has no necessity of concerning about miscibility to the other polymers.

The other object of the present invention is to provide a water-based coating composition obtained by dispersing in water an acrylic copolymer containing an acrylic monomer with a high ultraviolet absorbing ability and a wide wavelength range thereof and a vinyl monomer containing a carboxyl group, as a comonomer.

BRIEF SUMMARY OF THE INVENTION

According to one embodiment of the present invention, there is provided an acrylic copolymer which may be obtained by copolymerizing a monomer mixture containing an acrylic ester and a methacrylic ester in a total amount of 50 percent by mass or more, 1 to 90 percent by mass of which total amount is an ultraviolet absorbing monomer represented by the formula

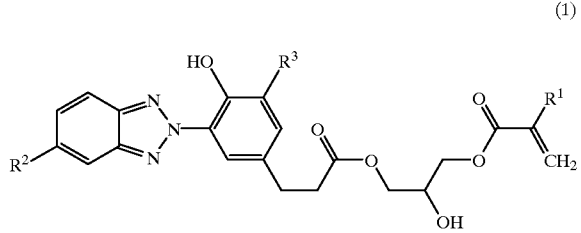

(1)

wherein $R^1$ is hydrogen or a methyl group, $R^2$ is a halogen atom or hydrogen and $R^3$ is hydrogen or an alkyl group having 1 to 5 carbon atoms. This acrylic copolymer is very effective in production of non-water-based coating composition having the ability of shielding ultraviolet rays.

According to the other embodiment, there is provided an acrylic copolymer which is obtained by modifying the above-described acrylic copolymer to be hydrophilic. The modified copolymer, which is miscible with an aqueous solvent, may be produced by copolymerizing a monomer mixture containing a carboxyl group-containing vinyl monomer in an amount of 0.3 to 0.5 mole per 1 kg of the mixture and further containing an acrylic ester and a methacrylic ester in a total amount of 50 percent by mass or more, 1 to 90 percent by mass of which total amount is an ultraviolet absorbing monomer.

The water-based coating material according to the present invention comprises (A) 3 to 50 percent by mass of an acrylic copolymer derived from a monomer mixture containing an acrylic ester, a methacrylic ester and a carboxyl group-containing vinyl monomer, (B) 20 percent by mass or more of water, (C) 3 percent by mass or more of a hydrophilic solvent and (D) ammonia and/or amine in an amount of 0.5 to 1.1 chemical equivalent weight of the carboxyl groups in the acrylic copolymer; the monomer mixture containing the carboxyl group-containing vinyl monomer in an amount of 0.3 to 5 moles per 1 kg of the mixture and an ultraviolet absorptive monomer represented by formula (1) above in an amount of 1 to 90 percent by mass of the total amount of the acrylic and methacrylic esters in the monomer mixture.

DETAILED DESCRIPTION OF THE INVENTION

The ultraviolet absorptive monomer of formula (1) used in the present invention is an acrylic or methacrylic ester having an benzotriazole skeleton.

In formula (1), in the case where $R^2$ is a halogen atom, the most preferred is chlorine and in the case where $R^3$ is an alkyl group, preferred are ethyl or a branched alkyl group having 3 to 5 carbon atoms, such as isopropyl, t-butyl and t-amyl. Therefore, preferred ultraviolet absorptive monomers of formula (1) are the following compounds:

Monomer of $R^1$=methyl, $R^2$=chlorine and $R^3$=ethyl;
Monomer of $R^1$=hydrogen, $R^2$=chlorine and $R^3$=t-butyl;
Monomer of $R^1$=methyl, $R^2$=chlorine and $R^3$=t-butyl; and
Monomer of $R^1$=hydrogen, $R^2$=chlorine and $R^3$=ethyl.

Two or more of the ultraviolet absorptive monomers of formula (1) may be mixed.

The monomer mixtures used for the preparation of the inventive acrylic copolymer are distinguished, depending on whether they contain a carboxylic group-containing vinyl monomer as a monomer component or not. Monomer mixtures containing no carboxylic group-containing vinyl monomer will be conveniently hereinafter referred to as "first monomer mixture" and monomer mixtures containing the same will be hereinafter referred to as "second monomer mixture".

Both first and second monomer mixtures are commonly required to fulfill the conditions that they contain an acrylic ester and a methacrylic ester in a total amount of 50 percent by mass or more, preferably 70 percent by mass or more and more preferably 80 percent by mass or more and that 1 to 90 percent by mass, preferably 5 to 70 percent by mass of the total amount of the acrylic and methacrylic ester is the ultraviolet absorptive monomer represented by formula (1). Furthermore, in the case where the first or second monomer mixture contains the acrylic and methacrylic esters including the ultraviolet absorbing monomer of formula (1) in the total amount of less than 100 percent by mass, it requisitely contains a vinyl monomer which is a monomer other than acrylic and methacrylic esters or a monomer having no carboxyl groups.

If the first and second monomer mixtures are less in the ultraviolet absorbing monomer content, than the above-described minimum value, the resulting acrylic copolymer would possibly be poor in an ultraviolet shielding ability, while if the first and second monomer mixtures are greater in the same than the above maximum value, the resulting acrylic copolymer would have a reduced solubility in an aqueous or non-aqueous solvent and thus the coat-film formed from the copolymer would possibly become brittle.

Regardless of whether the monomer mixture is the first monomer or the second monomer, the monomer mixture used in the present invention necessarily contains an ultraviolet absorptive monomer represented by formula (1) as well as acrylic and methacrylic esters. In other words, the monomer mixture, if not containing an ultraviolet absorptive monomer of formula (1) of which $R^1$ is hydrogen, contains importantly an acrylic ester other than the ultraviolet absorptive monomer, while the monomer mixture, if not containing an ultraviolet absorbing monomer of formula (1) of which $R^1$ is methyl, contains importantly a methacrylic ester other than the ultraviolet absorbing monomer as well. The monomer mixture contains an acrylic monomer and a methacrylic monomer preferably in the mass ratio of 1:0.5 to 1:5. Generally speaking, an increase of the acrylic monomer content in the monomer mixture of the present invention results in a softened copolymer, while an increasing of the methacrylic monomer content results in a hardened copolymer which is thus more brittle.

For the sake of convenience, both acrylic and methacrylic esters are hereinafter referred to as "(metha)acrylic ester" in this specification. The above-mentioned (metha)acrylic esters other than the ultraviolet absorptive monomer contained in the first and second monomer mixture may be alkyl esters and aralkyl esters. Eligible alkyl esters are those having 1 to 10 carbon atoms, such as methyl, ethyl, propyl, butyl, isobutyl, sec-butyl, t-butyl, amyl, neoamyl, hexyl, ethylhexyl, octyl, nonyl, decyl, dodecyl and hexadecyl esters.

Eligible aralkyl esters are benzyl, phenylethyl and naphtylmethyl esters.

Besides these, cyclohexyl esters, hydroxyethyl esters and diethylene glycol monoethyl esters are also eligible as the (metha)acrylic esters defined in the present invention.

The first and second monomer mixtures may contain one or more vinyl monomer selected from the group consisting of styrene, α-methylstyrene, p-acetoxystyrene, acrylonitrile, methaacrylonitrile, acrylamide, methacryloamide, vinyl acetate, diester maleate and maleinimide, as optional comonomer components. These optional comonomer components are neither acrylic esters nor methacrylic esters and contains no carboxyl groups. Therefore, these optional comonomer components are those to be added to the first or second monomer mixture which contains acrylic and methacrylic esters in a total amount of less than 100 percent by mass.

Requirement peculiar to the second monomer mixture is to contain a vinyl monomer containing carboxyl groups, in an amount of 0.3 to 5 moles, preferably 0.5 to 3 moles per 1 kg of the monomer mixture.

The vinyl monomer containing carboxyl groups may be one or more selected from the group consisting of acrylic acid, methacrylic acid and α,β-unsaturated dicarboxylic acid. Eligible α,β-unsaturated dicarboxylic acids are maleic acid and fumaric acid.

These carboxyl group-containing vinyl monomers are components which provide the inventive acrylic copolymer with affinity for water and hydrophilic solvents. If the monomer mixture to be copolymerized is less in the amount of the carboxyl group-containing vinyl monomer, than the above described minimum, the resulting acrylic copolymer would be reduced in solubility in water or hydrophilic solvents. If the monomer mixture to be copolymerized exceeds in the amount of the carboxyl groups-containing vinyl monomer, than the above described maximum, the coating film of a coating composition containing the resulting acrylic copolymer would possibly lack in water resistance.

The monomer mixture is not prevented from containing comonomer components other than the above-described optional comonomer components.

Regardless of whether the monomer mixture is the first or second one, an acrylic copolymer having an ultraviolet shielding ability can be produced from the monomer mixture defined in the above, in the usual copolymerization method. For instance, a method can be employed in which the copolymerization is conducted by adding dropwise the monomer mixture or the solution thereof solving a common radical initiator therein, into a suitable solvent which is heated. Alternatively, the copolymerization may be conducted by adding dropwise the monomer mixture mixed with a polymerization initiator or the solution thereof into a reactor charged with a part or whole of a solvent and maintained at a predetermined temperature.

In the both cases, eligible polymerization initiators are radical initiators such as azobisisobutyronitrile, 2,2'-dimethylazobisisobutyronitrile and benzoyl peroxide. Eligible solvents for dissolving the monomer mixture and used as a reaction medium are alcohols, ethers and ketones and are those preferably having a boiling point of 240° C. or below. Preferred solvents are diglyme, propylene glycol monoacetic ester, propylene glycol monoacetic ester monomethyl ether, methoxybutanol, methyl Cellosolve, butyl Cellosolve, methylethyl ketone and methylisobutyl ketone. Any one or more of the solvents may be used in combination.

No particular limitation is imposed on the amount of the solvents upon copolymerization which amount may vary from 5 to 95 percent by mass, preferably from 10 to 90 percent by mass, more preferably from 20 to 80 percent by mass, of the final reaction mixture. No particular limitation is also imposed on the amount of the polymerization initiator which, however, may be selected within the range of 0.5 to 10 percent by mass, preferably 1 to 5 percent by mass, based on the total mass of the monomer. The reaction temperature may vary from 40 to 120° C., preferably 45 to 110° C., more preferably 50 to 100° C. The reaction time is adjusted within the range of 15 minutes to 20 hours, preferably 30 minutes to 10 hours, more preferably 1 hour to 5 hours.

There is another alternative copolymerization method in which the monomer mixture and a polymerization initiator are dissolved in a solvent, followed by passing the resulting solution through a heated reaction coil. The initiators, solvent type and amount, and reaction time and temperature are the same as those for the above-exemplified dropwise reaction.

Regardless of which the copolymerization method is employed, after the completion of the reaction, an acrylic copolymer is precipitated by adding dropwise the reaction mixture to a poor solvent such as hexane and heptane, of acrylic copolymers and then filtrated out or centrifuged thereby isolating the inventive copolymers.

The molecular weight and molecular weight distribution of the resulting acrylic copolymer can easily be measured by gel permeation chromatography (GPC). The weight average molecular weight of the inventive acrylic copolymer is found to be within the range of usually 5,000 to 200,000, preferably 10,000 to 100,000 when using a calibration curve of polystyrene. The weight average molecular weight of the acrylic copolymer of the present invention can be varied by adjusting the conditions of the polymerization reaction. However, too small molecular weight copolymer would result in the formation of a coating film which is reduced in strength and durability, while too large molecular weight copolymer would cause the increased viscosity of the reaction solution which is inconvenient for the following treatment.

A non-water-based coating material, i.e. coating composition can be obtained by dissolving the inventive acrylic copolymer derived from the first monomer mixture, in an organic solvent such as methylisobutylketone, methylethylketone, acetone, diglyme (diethylene glycol dimethyl ether) and triglyme (triethylene glycol dimethyl ether). The coating composition may be directly applied onto materials such as glass thereby forming thereto a coating film having an ultraviolet shielding ability.

Whereas, the acrylic copolymer derived from the second monomer is readily dissolved in a water-based solvent containing an alkaline compound (neutralizer) such as ammonia and/or amine compounds due to the presence of carboxyl groups in the molecules.

The water-based coating composition according to the present invention may be prepared by dispersing and dissolving the acrylic copolymer derived from the second monomer mixture in a mixed solvent of a hydrophilic solvent containing ammonia and/or an amine compound and water. No particular limitation is imposed on the amine compound to be added to the mixed solvent. However, it is preferred to use an amine compound having a molecular weight of 300 or less, preferably 200 or less, in view of the formation of a coating film which dries fast. Specific examples of such amine compounds are aliphatic primary, secondary and tertiary amines such as hexylamine, diisopropylamine and triethylamine and aromatic amines such as N,N-dimethylaniline and benzylamine and heterocyclic amines such as 2,6-lutidine. It is also possible to use N,N-dimethylmonoethanolamine having in its molecules a hydroxyl group and ethyl2-aminoethylether having ether bonds.

The mixture of two or more of the amine compounds can be put in use and can be used in combination with ammonia. The total amount of ammonia and/or amine compounds in the coating composition of the present invention is adjusted to be 0.5 to 1.1, preferably 0.65 to 0.95 chemical equivalent weight of the carboxyl groups in the acrylic copolymer. Too less content of an alkaline compound in the mixed solvent would reduce the ability of solving the acrylic copolymer, while too much content of an alkaline compound could cause hydrolyzation of the acrylic copolymer.

As described above, the dispersion medium of the coating composition according to the present invention is comprised of water and a hydrophilic solvent. No particular limitation is imposed on the type of hydrophilic solvent. Oxygen-containing organic solvents are generally used, such as alcohols, ethers and ketones. More specific examples are 4-methoxybutanol, propylene glycol monomethyl ether, butyl Cellosolve, 2-propanol(isopropanol), diglyme and methylethyl ketone. The amount of water to be contained in the inventive water-based coating composition may be adjusted within the range of 20 percent by mass or more, preferably 25 to 88 percent by mass, while the amount of the hydrophilic solvent may be adjusted to be 3 percent by mass or more, preferably within the range of 5 to 50 percent by mass. Contents of the hydrophilic solvent less than 3 percent by mass would result in a coating composition which is responsible for irregularities in the formed coating film, while contents greater than 50 percent by mass would increase the flammability and odor of the resulting coating composition.

The acrylic copolymer concentration in the coating composition according to the present invention is within the range of 30 to 50 percent by mass, preferably 7 to 30 percent by mass. Less than 3 percent by mass of the acrylic copolymer would cause a difficulty in forming a coating film with sufficient thickness, while greater than 50 percent by mass of the acrylic copolymer would cause a difficulty in forming a uniform coating film.

When the above-described hydrophilic solvent is used as a reaction solvent in the polymerization reaction for synthesizing the acrylic copolymer, the resulting reaction mixture may be used in the preparation of the coating composition without separating the acrylic copolymer from the reaction mixture.

If necessary, various additives such as defoaming agents, leveling agents and surface slipping agents may be added to the inventive coating composition. Defoaming agents may be mineral oil- or silicone- based, but mineral oil based ones are more effective. The amount of the defoaming agent may be selected to an extent that the coating surface would not become rough, and within the range of 1 percent by mass or less, based on the composition. Eligible leveling agents are various types of leveling agents which may be of anion-, nonion- and acetylene-based. The amount of the leveling agent is selected from the range of 1 percent by mass or less. Too much addition of the leveling agent would cause foaming and thus is not preferred. The surface slipping agents may be reactive- or non-reactive silicone compounds. The use of the reactive surface slipping agents is advantageous in that they can impart slip properties which are less changeable with the lapse of time to the coating film. The reactive surface slipping agent is added in an amount of 0.05 to 1.0 percent by mass, preferably 0.1 to 0.5 percent by mass, based on the composition. The non-reactive surface slipping agent is added in an amount of 0.01 to 0.2 percent by mass, preferably 0.02 to 0.1 percent by mass, based on the composition.

The coating composition according to the present invention contains an acrylic copolymer having an ultraviolet absorptivity and dispersed in a mixed solvent of water and a hydrophilic solvent and thus can be applied over surfaces of a base material without giving concerns to flammability and toxicity, thereby prohibiting ultraviolet rays from passing through the base material and from deteriorating the base material. For example, the inventive water-based coating composition is applied over plastics-made product or the covering or sheathing material of transmission lines which are prone to deterioration caused by ultraviolet rays so as to form the coating film thereover, thereby avoiding the occurrence of such deterioration. Furthermore, the inventive coating composition may be applied to windowpanes of buildings and windshields of automobiles, glass vessels, covers or lenses of illuminants so as to provide them with an ultraviolet shielding ability.

Alternatively, the coating composition according to the present invention can be used as an ultraviolet shielding paint or coating material for household use. Generally, when someone from a household applies a coating composition to a glass, the resulting coating film tends to be marred in appearance due to spotting and running of the coating composition. However, the coating composition according to the present invention can perform a high ultraviolet shielding ability even with a minimum coating film thickness and thus is advantageous in that the above-mentioned inconveniences can be resolved.

The ultraviolet shielding coating materials suitable for household use are those produced by blending a composition containing 10 to 20 percent by mass of the acrylic copolymer of the invention obtained by copolymerizing a monomer mixture containing 5 to 70 percent by mass of a compound of formula (1), 50 to 80 percent by mass of water and 5 to 35 percent by mass of a hydrophilic solvent, with a suitable amount of a leveling agent.

The invention will be further described by way of the following examples which are provided for illustrative purposes only.

The GPC measurement in each example was conducted under the following conditions:

| | |
|---|---|
| Solvent | tetrahydrofurane |
| Column | GMH6 x2 |
| Flow rate | 1 ml/min |
| Detector | Refractometer |
| Concentration | 1 mass % |
| Temperature | 23° C. |
| Injected sample | 150 μl |
| Calibration curve | polystyrene |

The copolymer concentration of a solution containing an acrylic copolymer was measured by weighing the solution after 5 grams of acetone were added to 0.4 to 0.6 gram of the solution weighed into an aluminum petri dish of 7 cm diameter, which had been heated at a temperature of 150° C. until a constant weight was reached to be spread thereover and then dried at room temperature for 5 hours and again dried by heating at a temperature of 125° C. for 4 hours.

The carboxyl group contained in the acrylic copolymer was determined by titrating the copolymerization reaction mixture or the concentrate thereof dissolved in propylene glycol monomethyl ether, with a propylene glycol monomethyl ether solution (concentration 0.05 mol/l) of KOH.

EXAMPLE 1

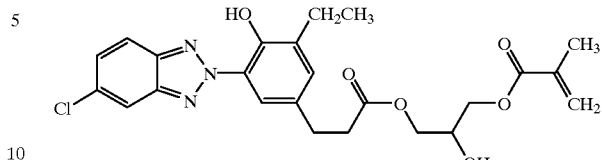

| | |
|---|---|
| Ultraviolet absorbing monomer of the above formula | 83 g |
| Butyl acrylate | 17 g |
| Azobisisobutyronitrile | 3 g |

The above mixture was dissolved in 500 g of ethanol and added dropwise to 500 g of isopropanol maintained at 60° C., over 1 hour, followed by stirring at the same temperature for 3 hours. A portion of the resulting mixture was added dropwise to hexane to separate the copolymerized product. The copolymerized product was found to be 24,000 in weight-average molecular weight by the GPC measurement.

The application of the polymerized product over a glass surface resulted in the formation of an ultraviolet absorptive film having the following excellent properties:

| | |
|---|---|
| Pencil hardness | H |
| Adherence grid test | 100/100 |
| Ultraviolet permeability | 2.3% (wavlength 390 nm, film thickness 2.5 μm) |

EXAMPLE 2

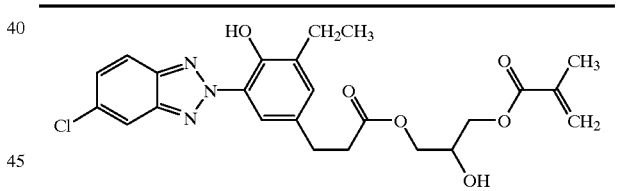

| | |
|---|---|
| Ultraviolet absorptive monomer of the above formula | 50 g |
| Methyl methacrylate | 5 g |
| N,N-dimethylmethacrylic acid amide | 10 g |
| Methacrylic acid | 35 g |
| Benzoyl peroxide | 5 g |

The above mixture was added dropwise to 500 g of isopropanol maintained at a temperature of 50° C., over 1 hour and then heated to 80° C., followed by being stirred for 3 hours. After the resulting reaction mixture was added dropwise to 3 liters hexane, the precipitated polymerized product was separated by centrifugation. The yield of the polymerized product was 95 grams. The polymerized product was found to be 27,000 in weight-average molecular weight by the GPC measurement. The separated polymerized product was dissolved in a diluted ammonia water until the concentration of the polymerized product reached 12 percent by mass. The resulting solution was applied over a glass surface thereby forming an excellent ultraviolet absorptive film having the following properties:

| | |
|---|---|
| Pencil hardness | B |
| Adherence grid test | 100/100 |
| Ultraviolet permeability | 0.29% (wavelength 390 nm, film thickness 6.5 μm) |

EXAMPLE 3

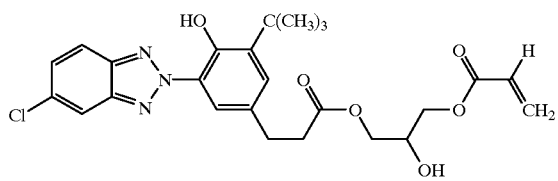

| | |
|---|---|
| Ultraviolet absorptive monomer of the above formula | 20 g |
| Cyclohexyl Acrylate | 5 g |
| Diethylene glycol monoacrylic ester | 10 g |
| Methacrylic 2-ethylhexyl | 10 g |
| Benzyl Acrylate | 20 g |
| Methacrylic 2-hydroxyethyl | 30 g |
| Benzoyl peroxide | 7 g |

The above mixture was dissolved in 1 kg of methylisobutyl ketone and then added dropwise to 500 grams of isopropanol maintained at 40° C., over 4 hours, followed by 4 hour stirring at the same temperature. A portion of the resulting reaction mixture was added dropwise to hexane to separate the polymerized product which was found to be 121,000 in weight-average molecular weight by the GPC measurement. The polymerized product was applied over a glass surface as it is thereby forming an excellent ultraviolet shielding film having the following properties:

| | |
|---|---|
| Pencil hardness | HB |
| Adherence grid test | 100/100 |
| Ultraviolet permeability | 2.5% (wavelength 390 nm, film thickness 10 μm) |

| | |
|---|---|
| Ultraviolet absorptive monomer of Example 3 | 20 g |
| Methyl methacrylate | 40 g |
| 2-ethyhexyl acrylate | 30 g |
| Methacryiic acid | 10 g |
| Azobisisobutyronitrile | 5 g |

The above mixture was dissolved in 100 g of butyl Cellosolve and then added dropwise to 300 g of isopropanol maintained at 60° C., over 2 hours. After completion of the addition, the mixture was stirred at the same temperature for 2 hours and then heated to 80° C., followed by another 2-hour stirring. A portion of the resulting reaction solution was added dropwise to hexane so as to separate the polymer. The polymer was found to be 34,000 in weight-average molecular weight by the GPC measurement. The copolymerized reaction solution was condensed so as to remove 350 g of the solvent. The copolymer solution and carboxyl group content of the resulting syrupy solution were 67 percent by mass and 1.16 mole/kg.

10.35 g (1.0 equivalent weight) of diisopropanolamine (neutralizer) were added to 100 grams of the syrupy copolymerization solution and then stirred well, followed by addition of water so as to bring the total weight thereof to 1 kg, thereby obtaining a coating material containing 6.7 percent by mass of the copolymer, 3.3 percent by mass of a hydrophilic solvent and 89.0 percent by mass of water.

The resulting coating material was applied over a glass surface thereby forming an excellent ultraviolet shielding film having the following properties:

| | |
|---|---|
| Pencil hardness | HB |
| Adherence grid test | 100/100 |
| Ultraviolet permeability | 2.7% (wavelength 390 nm, film thickness 10 μm) |

EXAMPLE 5

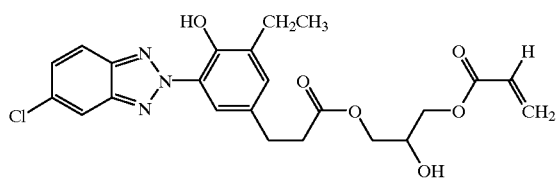

| | |
|---|---|
| Ultraviolet absorptive monomer of the above formula | 30 g |
| Methyl methacrylate | 40 g |
| Butyl acrylate | 10 g |
| Hydroxyethyl methacrylate | 20 g |
| Azobisisobutyronitrile | 5 g |

The above mixture was dissolved in 100 g of butanol and then added dropwise to 800 g of isopropanol maintained at 70° C., over 2 hours. The mixture was stirred at the same temperature for 2 hours and then heated to 90° C., followed by another 2-hour stirring. A portion of the resulting mixture was added dropwise to hexane so as to separate the polymerized product. The polymerized product was found to be 38,000 in weight-average molecular weight by the GPC measurement. Applying the polymerized product over a glass surface resulted in the formation of an excellent ultraviolet shielding film having the following properties:

| | |
|---|---|
| Pencil hardness | F |
| Adherence grid test | 100/100 |
| Ultraviolet permeability | 2.7% (wavelength 390 nm, film thickness 10 μm) |

EXAMPLE 6

| | |
|---|---|
| Ultraviolet absorptive monomer of Example 3 | 40 g |
| Methyl methacrylate | 20 g |
| 2-ethyhexyl acrylate | 20 g |
| Methacrylic acid | 20 g |
| Azobisisobutyronitrile | 7 g |

The above mixture was dissolved in 100 g of butyl Cellosolve and then added dropwise to 300 g of isopropanol maintained at 60° C., over 2 hours. The resulting mixture was stirred at the same temperature for 2 hours and then heated to 80° C., followed by another 2-hour stirring. A part of the resulting reaction solution was added dropwise to hexane to separate the polymer which was found to be 34,000 in weight-average molecular weight by the GPC measurement. The polymerized solution was condensed to remove 330 g of the solvent and then diluted with an aqueous triethylamine solution till the polymer concentration was reached 17.5 percent by mass, thereby preparing a water-based coating material. The coating material was applied over a glass surface, thereby forming an excellent ultraviolet shielding film having the following properties:

| Pencil hardness | HB |
|---|---|
| Adherence grid test | 100/100 |
| Ultraviolet permeability | 2.7% (wavelength 390 nm, film thickness 10 μm) |

EXAMPLE 7

| Ultraviolet absorptive monomer of Example 3 | 35 g |
|---|---|
| Methyl methacrylate | 13 g |
| Hydroxyethyl methacrylate | 15 g |
| Methacrylic acid | 30 g |
| Styrene | 7 g |
| Benzoyl peroxide | 3 g |

The above mixture was added dropwise to 200 g of isopropanol maintained at 50° C., over 5 hours and then refluxed for 2 hours. The resulting reaction mixture was added dropwise to 2 liters of hexane and the precipitate thus formed was separated by centrifugation. The yield of the resulting polymerized product was 92 grams and the weight-average molecular weight thereof was found to be 12,500 by GPC. Added to the separated polymerized product were 13.7 grams of triethylamine, 50 grams of butyl Cellosolve and 500 grams of water thereby preparing a coating liquid. The coating liquid was applied over a glass surface thereby obtaining a coating film which was satisfactory in terms of an ultraviolet shielding ability and film performance.

| Pencil hardness | H |
|---|---|
| Adherence grid test | 100/100 |
| Ultraviolet permeability | 4.0% (wavelength 390 nm, film thickness 3 μm) |

EXAMPLE 8

| Ultraviolet absorptive monomer of Example 3 | 25 g |
|---|---|
| Methacrylic acid | 15 g |
| Butyl methacrylate | 15 g |
| Ethylhexyl acrylate | 10 g |
| Methyl methacrylate | 30 g |
| Styrene | 5 g |
| Benzoyl peroxide | 3 g |

The above mixture was added dropwise to 200 grams of isopropanol maintained at 50° C.,over 5 hours and then refluxed for 2 hours. The resulting reaction mixture was added dropwise to 2 liters of hexane and then the precipitate thus formed was separated by centrifugation. The yield of the resulting polymer was 92 grams and the weight-average molecular weight thereof was found to be 12,500 by the GPC measurement. Added to the separated polymerized product was 14.5 grams of triethylamine, 50 grams of butyl Cellosolve and 500 grams of water thereby preparing a coating liquid. The coating liquid was applied over a glass surface thereby obtaining a coating film which was satisfactory in terms of ultraviolet shielding ability and film performance.

| Pencil hardness | H |
|---|---|
| Adherence grid test | 100/100 |
| Ultraviolet permeability | 3.5% (wavelength 390 nm, film thickness 3 μm) |

COMPARATIVE EXAMPLE 1

| Ultraviolet absorptive monomer of Example 3 | 0.5 g |
|---|---|
| Methyl methacrylate | 39.5 g |
| Methacrylic acid | 20 g |
| Butyl acrylate | 40 g |
| Azobisisobutyronitrile | 10 g |

The above mixture was dissolved by mixing and added dropwise to 900 grams of isopropanol maintained at 60° C., over 2 hours, followed by being stirred at the same temperature for 2 hours and heated to 80° C. for another 2-hour stirring. A portion of the resulting mixture was added dropwise to hexane so as to separate the polymerized product. The GPC measurement revealed that the product had a weight-average molecular weight of 54,000. The polymerized product was condensed and then diluted with an triethylamine aqueous solution thereby preparing a water-based coating material. The coating material was applied over a glass surface and the resulting film was insufficient in terms of ultraviolet shielding ability.

| Pencil hardness | B |
|---|---|
| Adherence grid test | 100/100 |
| Ultraviolet permeability | 65% (wavelength 390 nm, film thickness 10 μm) |

COMPARATIVE EXAMPLE 2

| Ultraviolet absorptive monomer (a) of Example 3 | 50 g |
|---|---|
| Ultraviolet absorptive monomer (b) of Example 5 | 45 g |
| Methyl methacrylate | 5 g |
| Benzoyl peroxide | 3 g |

The above mixture was dissolved by mixing and added dropwise to 900 grams of isopropanol maintained at 60° C., over 2 hours, followed by stirring at the same temperature for 2 hours and heating to 80° C. for another 2-hour stirring. A portion of the resulting mixture was added dropwise to hexane so as to separate the polymer and the GPC measurement thereof revealed that it had a weight-average molecular weight of 52,000. The polymerized solution was applied over a glass surface and the resulting film was satisfactory in terms of ultraviolet shielding ability but was fragile and thus unsatisfactory in terms of adherence to the glass surface.

| | |
|---|---|
| Pencil hardness | 2H |
| Adherence grid test | 100/100 |
| Ultraviolet permeability | 0.6% (wavelength 390 nm, film thickness 3 μm) |

COMPARATIVE EXAMPLE 3

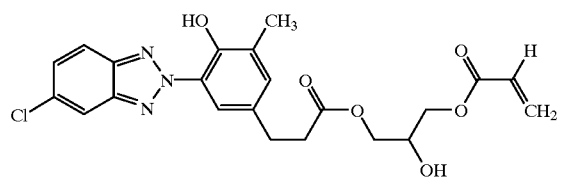

| | |
|---|---|
| Ultraviolet absorptive monomer of the above formula | 35 g |
| Propyl methacrylate | 15 g |
| Benzyl methacrylate | 15 g |
| Methyl methacrylate | 35 g |
| Benzoyl peroxide | 3 g |

The above mixture was dissolved by mixing and added dropwise to 2,500 grams of isopropanol maintained at 60° C., over 2 hours. The mixture was stirred at the same temperature for 2 hours and heated to 80° C., followed by another 2-hour stirring. A portion of the resulting mixture was added dropwise to hexane so as to separate the polymerized product and the GPC measurement thereof revealed that it had a weight-average molecular weight of 11,000. The polymerized product was applied over a glass surface and the resulting film was satisfactory in terms of ultraviolet shielding ability but unsatisfactory in terms of hardness because of being too soft.

| | |
|---|---|
| Pencil hardness | 3B |
| Adherence grid test | 100/100 |
| Ultraviolet permeability | 4% (wavelength 390 nm, film thickness 3 μm) |

EXAMPLE 9

| | |
|---|---|
| Ultraviolet absorptive monomer of Example 1 | 83 g |
| Butyl acrylate | 10 g |
| Methacrylic acid | 7 g |
| Azobisisobutyronitrile | 3 g |

The above mixture was dissolved in 500 grams of ethanol and added dropwise to 500 grams of isopropanol maintained at 60° C., over one hour and thereafter the mixture was copolymerized by stirring for 3 hours. A portion of the resulting copolymerization solution was added dropwise to hexane so as to separate the polymerized product and the GPC measurement thereof revealed that it had a weight-average molecular weight of 24,000.

The copolymerization reaction solution was distilled so as to remove 400 grams of ethanol thereby sampling 201 grams of a syrupy copolymerization solution. The concentration of the copolymerization solution was 49.8 percent by mass and the content of carboxyl group thereof was 0.813 mole per 1 kg of the copolymer. 0.8 equivalent weight (15.23 g) of ammonia water (neutralizer) at a concentration of 25 percent by mass was added to 200 grams of the syrupy copolymerization solution and then stirred well, followed by addition of water so as to bring the total weight thereof to 1 kg, thereby obtaining a coating material containing 10 percent by mass of an acrylic copolymer, 10.0 percent by mass of a hydrophilic solvent and 79.6 percent by mass of water.

After the resulting coating material was applied over a glass surface using a brush and dried, the resulting coating film was evaluated by measuring its surface hardness, adherence and ultraviolet permeability. The results are as follows:

| | |
|---|---|
| Pencil hardness | H |
| Adherence grid test | 100/100 |
| Ultraviolet permeability | 2.3% (wavelength 390 nm, film thickness 2.5 μm) |

EXAMPLE 10

| | |
|---|---|
| Ultraviolet absorptive monomer of Example 2 | 50 g |
| Methyl methacrylate | 5 g |
| N,N-dimethyl amide methacrylate | 10 g |
| Methacrylic acid | 35 g |
| Benzoyl peroxide | 5 g |

The above mixture was added dropwise to 500 grams of isopropanol maintained at 50° C., over one hour and then copolymerized by heating to 80° C. and stirring for 3 hours. The resulting copolymerized solution was added dropwise to 3 liters of hexane and then the precipitated copolymer was separated by centrifugation. The yield of the copolymer was 95 grams and the weight-average molecular weight derived from the GPC measurement was 27,000. Titration of the copolymer revealed that the content of carboxyl group was 4.1 moles per 1 kg.

15.3 grams (0.65 equivalent weight) of monoethanol amine (neutralizer) and 200 grams of butyl Cellosolve were added to 95 grams of the copolymer and then stirred well, followed by addition of water so as to bring the total weight thereof to 1 kg, thereby obtaining a coating material containing 9.5 percent by mass of an acrylic copolymer, 20.0 percent by mass of a hydrophilic solvent and 69.0 percent by mass of water.

After the resulting coating material was applied over a glass surface using a brush and dried, the resulting coating film was evaluated by measuring its surface hardness, adherence and ultraviolet permeability. The results are as follows:

| | |
|---|---|
| Pencil hardness | B |
| Adherence grid test | 100/100 |
| Ultraviolet permeability | 0.29% (wavelength 390 nm, film thickness 6.5 μm) |

EXAMPLE 11

| | |
|---|---|
| Ultraviolet absorptive monomer of Example 3 | 20 g |
| Cyclohexyl acrylate | 10 g |
| Diethylene glycol monoacrylic ester | 10 g |
| 2-ethylhexyl methacrylate | 10 g |
| Benzyl acrylate | 20 g |
| 2-hydroxyethyl methacrylate | 15 g |
| Methacrylic acid | 15 g |
| Benzoyl peroxide | 7 g |

The above mixture was dissolved in 1 kg of methylisobutyl ketone and then added dropwise to 500 grams of isopropanol maintained at 40° C., over 4 hours. The mixture was copolymerized by stirring at the same temperature for 4 hours. The resulting copolymerized solution was added dropwise to 5 liters of hexane thereby separating 88 grams of the copolymer. The weight-average molecular weight of the polymer derived from GPC was 121,000. Titration of the copolymer revealed that the content of carboxyl group was 1.74 mole per 1 kg.

16.94 grams (0.9 equivalent weight) of dimethylbenzyl amine (neutralizer) and 50 grams of 4-methoxybutanol were added to 80 grams of the copolymer and then stirred well, followed by addition of water so as to bring the total weight thereof to 1 kg, thereby obtaining a coating material containing 26.7 percent by mass of the copolymer, 16.7 percent by mass of a hydrophilic solvent and 51.0 percent by mass of water.

After the resulting coating material was applied over a glass surface by dipping and dried, the resulting coating film was evaluated by measuring its surface hardness, adherence and ultraviolet permeability. The results are as follows:

| | |
|---|---|
| Pencil hardness | HB |
| Adherence grid test | 100/100 |
| Ultraviolet permeability | 2.5% (wavelength 390 nm, film thickness 10 μm) |

EXAMPLE 12

| | |
|---|---|
| Ultraviolet absorptive monomer of Example 3 | 30 g |
| Methyl methacrylate | 40 g |
| Butyl acrylate | 10 g |
| Hydroxyethyl methacrylate | 5 g |
| Acrylic acid | 15 g |
| Azobisisobutyronitrile | 5 g |

The above mixture was dissolved in 100 grams of 4-methoxybutanol and then added dropwise to 800 grams of isopropanol maintained at 70° C., over 2 hours, followed by 2-hour stirring at the same temperature. The mixture was copolymerized by heating to 90° C. and stirring for 2 hours. The resulting copolymerized solution was added dropwise to hexane thereby separating 87 grams of the polymer. The GPC measurement of the polymer revealed that it was 38,000 in weight-average molecular weight. The carboxyl group content of the polymer was found to be 2.09 mol/kg.

15.7 grams (1.0 equivalent weight) of 2,6-lutidine (neutralizer) and 150 grams of diglyme were added to 70 grams of the copolymer and then stirred well, followed by addition of water so as to bring the total weight thereof to 500 grams, thereby obtaining a coating material containing 14 percent by mass of an acrylic copolymer, 30 percent by mass of a hydrophilic solvent and 52.9 percent by mass of water.

After the resulting coating material was applied over a glass surface using a 4-mils applicator and dried, the resulting coating film was evaluated by measuring its surface hardness, adherence and ultraviolet permeability. The results are as follows:

| | |
|---|---|
| Pencil hardness | F |
| Adherence grid test | 100/100 |
| Ultraviolet permeability | 2.7% (wavelength 390 nm, film thickness 10 μm) |

EXAMPLE 13

| | |
|---|---|
| Ultraviolet absorptive monomer of Example 3 | 40 g |
| Methyl methacrylate | 20 g |
| 2-ethyhexyl acrylate | 20 g |
| Methacrylic acid | 20 g |
| Azobisisobutyronitrile | 5 g |

The above mixture was dissolved in 50 grams of diglyme and then added dropwise to 50 grams of isopropanol maintained at 60° C., over 2 hours, followed by 2-hour stirring at the same temperature. The mixture was copolymerized by heating to 80° C. and stirring for 2 hours. A portion of the resulting copolymerized solution was added dropwise to hexane thereby separating 87 grams of the polymer. The GPC measurement of the polymer revealed that it was 34,000 in weight-average molecular weight. The copolymer concentration and carboxyl group content of the polymer was measured and found to be 49.3 percent by mass and 2.33 mol/kg.

6.65 grams (0.85 equivalent weight) of ammonia water at a concentration of 25 percent by mass (neutralizer) was added to 100 grams of the copolymer and then stirred well, followed by addition of water so as to bring the total weight thereof to 350 grams, thereby obtaining a water-based coating material containing 14.1 percent by mass of the copolymer, 14.5 percent by mass of a hydrophilic solvent and 71.0 percent by mass of water.

The resulting coating material was applied over a glass surface thereby obtaining an excellent ultraviolet shielding film having the following properties:

| | |
|---|---|
| Pencil hardness | HB |
| Adherence grid test | 100/100 |
| Ultraviolet permeability | 2.7% (wavelength 390 nm, film thickness 10 μm) |

EXAMPLE 14

| | |
|---|---|
| Ultraviolet absorptive monomer of Example 3 | 35 g |
| Methyl methacrylate | 13 g |
| Hydroxyethyl methacrylate | 15 g |
| Methyl methacrylate | 20 g |

| | |
|---|---|
| Methacrylic acid | 5 g |
| Maleic acid | 5 g |
| Styrene | 7 g |
| Benzoyl peroxide | 3 g |

The above mixture was added dropwise to 200 grams of isopropanol maintained at 50° C., over 5 hours. After completion of the addition, the mixture was copolymerized by refluxing for 2 hours. The resulting copolymerized solution was added dropwise to 2 liters hexane and the precipitates thus formed was separated by centrifugation. The weight of the resulting copolymer was 92grams. As a result of the GPC measurement, the copolymer has an weight-average molecular weight of 12,500. The carboxyl group content was 1.44 mole/kg.

10.1 grams (0.6 equivalent weight) of octylamine (neutralizer) and 150 grams of propylene glycol monoethyl ether were added to 90 grams of the copolymer and then stirred well, followed by addition of water so as to bring the total weight thereof to 400 grams, thereby obtaining a water-based coating material containing 22.5 percent by mass of the copolymer, 37.5 percent by mass of a hydrophilic solvent and 37.5 percent by mass of water.

The resulting coating material was applied over a glass surface using a sponge thereby obtaining an excellent ultraviolet shielding film having the following properties:

| | |
|---|---|
| Pencil hardness | H |
| Adherence grid test | 100/100 |
| Ultraviolet permeability | 4.0% (wavelength 390 nm, film thickness 3 μm) |

EXAMPLE 15

| | |
|---|---|
| Ultraviolet absorptive monomer of Example 3 | 25 g |
| Methacrylic acid | 15 g |
| Butyl methacrylate | 15 g |
| Ethylhexyl acrylate | 10 g |
| Methyl methacrylate | 10 g |
| Styrene | 5 g |
| Benzoyl peroxide | 3 g |

The above mixture was added dropwise to 200 grams of isopropanol maintained at 50° C., over 5 hours. After completion of the addition, the mixture was copolymerized by refluxing for 2 hours. The resulting copolymerized solution was added dropwise to 2 liters hexane and the precipitates thus formed was separated by centrifugation. The weight of the resulting copolymer was 92 grams. As a result of the GPC measurement, the copolymer has an weight-average molecular weight of 12,500. The carboxyl group content was 1.75 mole/kg.

11.3 grams (0.8 equivalent weight) of triethylamine (neutralizer) and 60 grams of butyl Cellosolve were added to 80 grams of the copolymer and then stirred well, followed by addition of water so as to bring the total weight thereof to 200 grams, thereby obtaining a water-based coating material containing 40.0 percent by mass of the copolymer, 30.0 percent by mass of a hydrophilic solvent and 24.4 percent by mass of water.

The resulting coating material was applied over a glass surface thereby obtaining an excellent ultraviolet shielding film having the following properties:

| | |
|---|---|
| Pencil hardness | H |
| Adherence grid test | 100/100 |
| Ultraviolet permeability | 3.5% (wavelength 390 nm, film thickness 3 μm) |

What is claimed is:

1. An ultraviolet absorptive acrylic copolymer obtained by copolymerizing a monomer mixture containing an acrylic ester and a methacrylic ester in a total amount of 50 percent by mass or more, 1 to 90 mass percent of which total amount is an ultraviolet absorptive monomer represented by the formula (1):

(1)

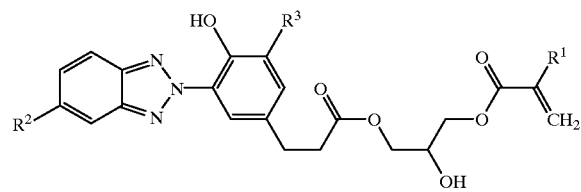

wherein $R^1$ is hydrogen or methyl, $R^2$ is a halogen atom or hydrogen and $R^3$ is hydrogen or an alkyl group having 1 to 5 carbon atoms;

said monomer mixture further containing a carboxyl group-containing vinyl monomer in an amount of 0.3 to 5 moles per 1 kg of said monomer mixture.

2. The acrylic copolymer according to claim 1, wherein acrylic ester and methacrylic ester which are contained in a total amount of 50 percent by mass or more of said monomer mixture, are selected from the group consisting of methylester, ethylester, propylester, butylester, isobutylester, sec-butylester, t-butylester, amylester, neoamylester, hexylester, ethylhexylester, octylester, nonylester, decylester, dodecylester, hexadecylester, benzylester, phenylethylester, naphtylmethylester, cyclohexylester, hydroxyethylester and diethylene glycol monoethylester.

3. The acrylic copolymer according to claim 1 wherein the mass ratio of the acrylic monomer to the methacrylic monomer in said monomer mixture is within the range of 1:0.5 to 1:5.

4. The acrylic copolymer according to claim 1, wherein said carboxyl group-containing vinyl monomer is one or more members selected from the group consisting of acrylic acid, methacrylic acid, maleic acid and fumaric acid.

5. A water-based coating composition which comprises (A) an acrylic copolymer, which is obtained by copolymerizing a monomer mixture containing an acrylic ester and a methacrylic ester in a total amount of 50 percent by mass or more, an ultraviolet absorptive monomer of formula (1)

(1)

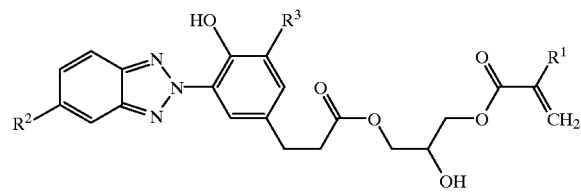

wherein $R^1$ is hydrogen or methyl, $R^2$ is a halogen atom or hydrogen and $R^3$ is hydrogen or an alkyl group having 1 to 5 carbon atoms, in an amount of 1 to 90 percent by mass of said total amount, and a carboxyl group-containing vinyl monomer in an amount of 0.3 to 5 moles per 1 kg of said monomer mixture, in an amount of 3 to 50 percent by mass (B) water in an amount of 20 percent by mass or more; (C) a hydrophilic solvent in an amount of 3 percent by mass or more and (D) ammonia anid/or amine in an amount of 0.5 to 1.0 chemical equivalent weight of the carboxyl groups in the acrylic copolymer.

6. The coating composition according to claim 5, wherein acrylic and methacrylic esters which are present in an amount of 50 percent by mass or more of said monomer mixture, are selected from the group consisting of methylester, ethylester, propylester, butylester, isobutylester, sec-butylester, t-butylester, amylester, neoamylester, hexylester, ethylhexylester, octylester, nonylester, decylester, dodecylester, hexadecylester, benzylester, phenylethylester, naphtylmethylester, cyclohexylester, hydroxyethylester and diethylene glycol monoethylester.

7. The coating composition according to claim 5, wherein the mass ratio of the acrylic monomer to the methacrylic monomer in said monomer mixture is within the range of 1:0.5 to 1:5.

8. The coating composition according to claim 5, wherein said carboxyl group-containing vinyl monomer is one or more members selected from the group consisting of acrylic acid, methacrylic acid, maleic acid and fumaric acid.

* * * * *